(12) United States Patent
Bernardy

(10) Patent No.: US 7,882,774 B1
(45) Date of Patent: Feb. 8, 2011

(54) BRUSHCUTTER BLADE

(76) Inventor: Eckhard Bernardy, P.O. Box 1226, Woodland, WA (US) 98674

(*) Notice: Subject to any disclaimer, the term of this patent is extended or adjusted under 35 U.S.C. 154(b) by 362 days.

(21) Appl. No.: 11/784,465

(22) Filed: Apr. 7, 2007

(51) Int. Cl.
B23D 57/00 (2006.01)
B26B 9/00 (2006.01)

(52) U.S. Cl. .............................. 83/835; 30/276; 30/347

(58) Field of Classification Search .................. 83/835, 83/831, 836–855, 676; 30/347, 353, 276; 56/53, 504, 12.5, 17.5
See application file for complete search history.

(56) References Cited

U.S. PATENT DOCUMENTS

| | | | | |
|---|---|---|---|---|
| 81,267 A | * | 8/1868 | Folmer ........................ | 83/835 |
| 149,748 A | * | 4/1874 | Hale ........................... | 83/835 |
| 2,645,010 A | * | 7/1953 | Holmes ........................ | 30/144 |
| 3,078,573 A | | 2/1963 | Kern | |
| 3,338,039 A | | 8/1967 | Nightingale | |
| 3,700,016 A | * | 10/1972 | Strobel ........................ | 83/848 |
| 3,712,349 A | * | 1/1973 | Toki ............................ | 83/835 |
| 3,730,038 A | * | 5/1973 | Farb ............................ | 83/837 |
| 3,781,991 A | * | 1/1974 | Stretton et al. ................ | 30/276 |
| 4,024,785 A | * | 5/1977 | Jansen-Herfeld ............ | 83/848 |
| 4,039,011 A | * | 8/1977 | Sword ........................ | 144/218 |
| 4,083,166 A | * | 4/1978 | Haas ........................... | 56/13.7 |
| 4,123,958 A | * | 11/1978 | Wright et al. ................ | 83/837 |
| 4,240,315 A | * | 12/1980 | Tuomaala .................... | 83/848 |
| 4,250,622 A | * | 2/1981 | Houle ........................ | 30/347 |
| 4,267,760 A | * | 5/1981 | Smith et al. .................. | 83/835 |
| 4,302,878 A | * | 12/1981 | Bonforte .................... | 30/276 |
| 4,368,610 A | * | 1/1983 | Aono ......................... | 56/295 |
| 4,432,264 A | * | 2/1984 | Scott ........................... | 83/835 |
| 4,527,382 A | * | 7/1985 | Aono ......................... | 56/295 |
| 4,766,794 A | * | 8/1988 | Blake ........................ | 83/847 |
| 4,769,977 A | | 9/1988 | Milbourn | |
| 4,893,457 A | * | 1/1990 | Castain ........................ | 56/295 |
| 4,922,791 A | | 5/1990 | Pinney | |
| 5,056,605 A | * | 10/1991 | Bond et al. .................. | 172/111 |
| 5,092,212 A | * | 3/1992 | Pawlosky .................... | 83/845 |
| 5,167,109 A | | 12/1992 | Minerding | |

(Continued)

FOREIGN PATENT DOCUMENTS

GB 2144314 A 3/1985

OTHER PUBLICATIONS

"Materials Science"; "Materials Science and Engineering an introduction" by William D. Callister Jr. © 2003 John Wiley and Sons p. 199.*

(Continued)

*Primary Examiner*—Kenneth E. Peterson
*Assistant Examiner*—Sean Michalski

(57) ABSTRACT

A brushcutter blade with an undulated peripheral cutting edge, wherein the edge alternates partly circular cutting sections, with partly arcuate, radially recessed cutting sections. Recessed cutting sections provide accelerated radial cutting and also additional axial shredding. Auxiliary axial segments are formed or deflected out of the blade body around a base line or juncture with the blade, at angles acute to the plane of the blade, and the openings through the blade created thereby, are radially outward of the juncture. The segments are configured to provide an inclined leading edge for each segment, that cuts a laterally extended path with the movement of the blade, and enhances both radial and axial shredding. A contrasting vivid color band on distal cutting sections optically merges into a distinctively visible cutting edge for obstacle avoidance and safety enhancement.

2 Claims, 1 Drawing Sheet

U.S. PATENT DOCUMENTS

| | | | |
|---|---|---|---|
| 5,197,268 A * | 3/1993 | Barrera | 56/255 |
| 5,261,306 A * | 11/1993 | Morey et al. | 83/840 |
| 5,361,570 A * | 11/1994 | Bernardy | 56/255 |
| 5,555,788 A * | 9/1996 | Gakhar et al. | 83/835 |
| 5,875,700 A * | 3/1999 | Powell | 83/837 |
| 6,116,823 A * | 9/2000 | Mihic | 407/40 |
| 6,298,762 B1 * | 10/2001 | LaRue et al. | 83/838 |
| 6,450,075 B1 * | 9/2002 | Manzo | 83/171 |
| 6,662,694 B2 * | 12/2003 | Rankin, Sr. | 83/13 |
| 6,688,206 B1 * | 2/2004 | Mummenhoff | 83/676 |
| 6,691,596 B1 * | 2/2004 | Singh et al. | 83/13 |
| 7,171,798 B1 * | 2/2007 | Bernardy | 56/295 |
| 7,451,677 B2 * | 11/2008 | Souza et al. | 83/835 |
| 7,487,704 B2 * | 2/2009 | Souza et al. | 83/835 |
| 2006/0112799 A1 * | 6/2006 | Hambleton et al. | 83/13 |
| 2006/0243115 A1 * | 11/2006 | Sakai et al. | 83/853 |
| 2006/0283303 A1 * | 12/2006 | Smith | 83/835 |
| 2007/0144325 A1 * | 6/2007 | Souza et al. | 83/835 |
| 2007/0180972 A1 * | 8/2007 | Lowder et al. | 83/835 |
| 2008/0022832 A1 * | 1/2008 | Curtsinger | 83/835 |
| 2008/0053364 A1 * | 3/2008 | Weaver | 116/298 |
| 2009/0114073 A1 * | 5/2009 | Souza et al. | 83/835 |

OTHER PUBLICATIONS

U.S. Appl. No. 10/187,238, Bernardy.
U.S. Appl. No. 10/187,238 Was Abandoned; For Purposes of Disclosure, The Sheet of Drawings is Hereby Submitted.

* cited by examiner

U.S. Patent    Feb. 8, 2011    US 7,882,774 B1
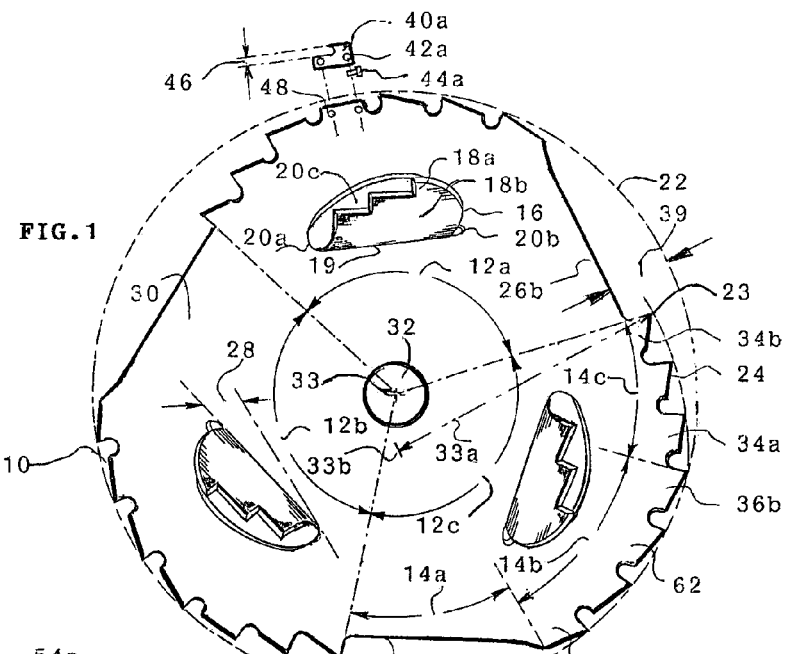
FIG. 1
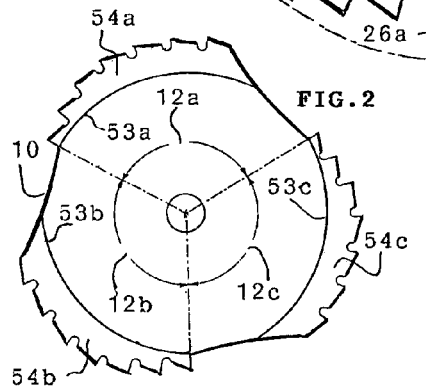
FIG. 2
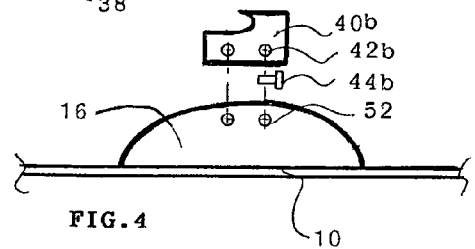
FIG. 4
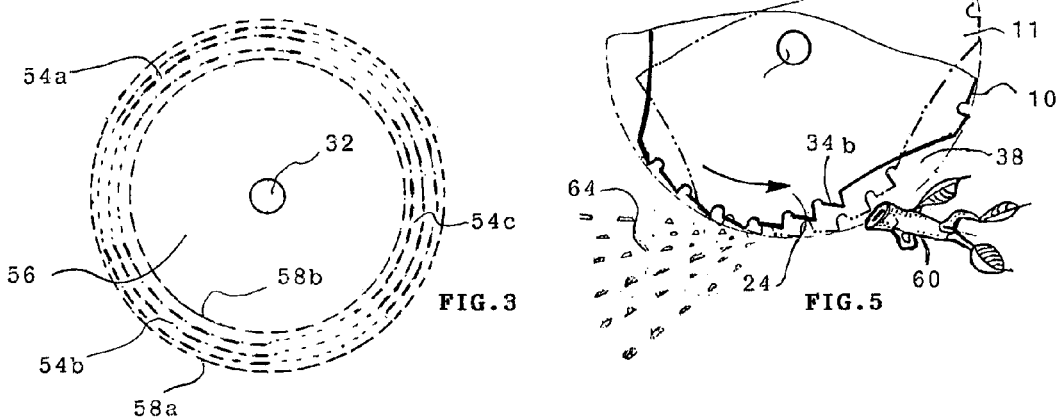
FIG. 3
FIG. 5

BRUSHCUTTER BLADE

FIELD OF INVENTION

This invention relates to blades used on portable, motorized brushcutters.

BACKGROUND OF THE INVENTION

Prior Art

Brushcutters are lightly motorized, hand held machines, commonly used by landscapers, foresters, farmers, homeowners and others, to trim grasses, weeds, vines, brush and small trees. They typically have a power unit, control handles, a carrying harness and a driven shaft. Stringtrimmer and other attachments can be put onto the distal end of the drive shaft, but for heavier work blades are used. Many different blades, of varying effectiveness, already exist. However, conventional brushcutter blades are typically tailored to be effective on a rather narrow range of vegetation. To illustrate, one class of blades is specifically designed for very light duty trimming tasks, just beyond the powers of a string trimmer, but limited to grasses or light weeds. Another class serves to trim somewhat heavier weeds or light brush. Yet another group of blades is for cutting of saplings, and so on.

Thus the traditional, conservative, design approach has resulted in many special purpose blades, but has produced no efficient all purpose blade, which can be used for the entire range of possible trimming tasks. An ideal all purpose blade would effectively trim the entire range of vegetation practical for brushcutters. The vegetation range suitable for trimming with brushcutters includes all grasses and weeds, light or heavy, all types of vines and brush and further, fairly substantial branching, as well as the trunks of heavier saplings up to nearly four inches in diameter. For even larger wood, hand or power saws are more effectively used.

The general terms 'trim', or 'trimming' can be divided more specifically into either shredding or cutting. Shredding is then defined as reducing vegetation into small bits and pieces, many just fractions of an inch in size. Effective, on site shredding of vegetation has great practical value. It dramatically reduces labor and job times and also cuts fuel use. Since small shreddings can often simply be left in place to serve as ground cover or mulch, no further disposal effort may be necessary. Organic ground covers retard weeds, conserve moisture and improve the soil through decomposition. This approach is environmentally quite sound. It eliminates additional time and labor and especially additional fuel, required to haul landscaping debris to some distant landfill. It further eliminates debris burning, with its inescapable air pollution. In addition, it can reduce or eliminate herbicide spraying with its attendant toxicity, run off, and surface or ground water pollution.

On site shredding and subsequent mulching, therefore elegantly resolves a number of problems associated with unwanted vegetation removal.

Cutting is herein defined as the ability to cut through substantial woody material, such as heavy vines, branches or saplings. It not practical to shred wood several inches in diameter with a hand held brushcutter. However, substantial sapling trunks can be conveniently cut into many small sections, with a suitable blade. Therefore, an efficient all purpose blade, capable of both shredding and cutting, is much more useful than any restricted, narrow function blade. Cutting and shredding are complementary. An efficient, all purpose blade has expanded utility. An operator is empowered to effectively handle any possible trimming job challenge in the field, with such a blade.

Despite these facts, nearly all presently existing blades were designed only as narrow use blades. Some blades, however, are somewhere in between and do a little of each, that is some shredding and some cutting, without much effectiveness. Old blackberry vines, dried out and weather hardened, already test the limits of such blades. Any substantial sapling trunk will shortly stop such blades entirely. Pure saw blade types, on the other hand, can readily cut saplings, vines and branches. However, such saw blades have no effective shredding cability whatsoever, and so they leave the handling and disposal problems still unresolved.

Field conditions are usually diverse. Needs arise to trim many different plant species, at different stages in their life cycles. Each presents a unique cutting or shredding problem. Any given job site may have a mix of grasses, weeds, vines, brush and saplings. Resorting to a different blade to fill each trimming need is inefficient. Multiple blades are also a nuisance to the user. Several blades need to be purchased. The initial cost is then followed by the necessity to exchange blades under field conditions. Therefore, replacing a number of relatively inefficient blades with just one single, but highly efficient blade that performs all tasks in superior fashion, is a more sensible, a far better idea. It is also the idea underlying the present invention.

In addition to all ordinary blades, an unconventional design is also at hand in U.S. Pat. No. 7,171,789 to Bemardy (2007), in a first, truly practical multipurpose blade. The blade combines shredding with cutting and provides the user with good field efficiency. It effectively combines forward axial shredding with radial cutting. This enables the blade to either shred or cut the entire range of vegetation including grasses and weeds, vines and branches and even small trees—in both forward and lateral, directions.

However, even this quite efficient blade has one significant weakness: it cannot shred at all on its backside.

The Bemardy blade cannot shred to the rear, because for good reasons, no axial cutting elements are placed on the rear side of the blade. Debris shields typically only give partial protection to the operator, because complete shielding would impair the functioning of the blade. Rear mounted axial cutting elements, would cast hazardous debris toward the operator. But without them, the blade has no rearward shredding action. The shortcoming is especially apparent during side to side scything in heavy weeds or light brush. The forward stroke fully engages the axial cutting elements and shreds very well. However, the blade on its return stroke can only make straight lateral cuts. Rearward shredding is precluded. The return stroke is therefore partially unproductive; up to 50% time and motion are wasted. While there is a field remedy—it is inconvenient.

The user must deliberately change the blade angle after each forward stroke. To re-engage the front facing axial cutting elements, the blade must be turned around to face the other way. It can be done, but the angle change needed is substantial. Repeated over and over, endlessly, during a day's work, the extra movements add a significant labor burden. Thus the price paid in effort to achieve rearward shredding is unacceptable and a better solution needs to be found.

U.S. Pat. No. 4,302,878 to Bonforte (1981) is a tri-element design, in star configuration. This is a good example of a very common, but also mediocre blade. It works on an assortment of weeds and light brush, but is stopped by heavy vines, branches or the trunks of any substantial saplings.

U.S. Pat. No. 3,781,991 to Stretton, et al, (1971) represents a closely related design with three or more blade portions radiating from a central hub. The greater the number of blade portions, usually, the smoother the cutting engagements, but at a cost of diminished shredding ability. Fully circular saw blades, for example, offer no effective shredding. The Stretton blade is one of those blades somewhere in between; it does a little of each, but it can neither cut nor shred very well.

U.S. Pat. No. 4,250,622 to Houle (1981) shows a blade even closer to a traditional saw blade. Tooth structure variations offer no unique performance aspects, but the use of elastomers definitely limits any heavy duty use. Cutting heavy vines or saplings is out of the question with this blade.

U.S. Pat. No. 4,368,610 to Aono (1983) transforms a traditional saw disk onto variations with recessed peripheral cutting edges. This design combines some axial with radial action. However, the upruptly staggered cutting edges largely compromise the smooth cutting inherent in traditional disk saw blades.

U.K. Application GB 2144314A, also by Aono (1985) adds bi-directionality to a blade not very dissimilar to the above first Aono designs, but performance drops due to fewer cutting engagemnents in either direction.

U.S. Pat. No. 5,197,268 to Barrera (1993) is strictly a grass blade combining a serrated disk hub with a protruding bar structure. In brush, the bar would make first contact with the extended bar and quickly run afoul. Low speed lawn mower blades are generally ill suited for high speed brushcutters. The fields are simply too different. No substantial saplings can be cut with this blade.

U.S. Pat. No. 4,922,791 to Pinney (1989) attaches chain saw cutting elements to a disk and has no apparent aspirations toward shredding, but instead offers only smooth radial saw cutting.

U.S. Pat. No. 3,338,039 to Nightingale (1967) is a blade with axially cupped cutting elements intended for grass. The lack of radial cutters obviates cutting outward, but the inventor again solved grass cutting, not brush cutting problems.

U.S. Pat. No. 3,078,573 to Kern (1963) featuring only axial cutting elements without radial elements, again prevents radial cutting and is of very limited usefulness.

U.S. Pat. No. 5,056,605 to Bond, et al, (1991) shows a disk with axial cutting elements in opposing directions, suitable for axial ripping, but apparently no radial cutting.

U.S. Pat. No. 5,167,109 to Minerding (1992) similarly shows only axial cutting elements and apparently is incapable of radial cutting.

U.S. Pat. No. 4,083,166 to Haas (1978), is for another mower blade with a fairly complex structure of a central disk with a bar attachment. The comments made above for the Barrera patent similarly apply and this device is not useful for high speed brushcutters, because the disk is shielded by the bar which would flail into the first substantial sapling, or tree branch and stop.

U.S. Pat. No. 4,769,977 to Milbourn (1988) shows a disk with both axial and radial cutting elements intended to strip entire large, standing trees of their branching at typically low 200 RPM to 400 RPM rotational speed and high torque application. The application is reversed in brushcutters with motor speeds over 12,000 RPM, but with relatively little torque. The axial cutting elements appear poorly defined but can of course be crude, provided they resist tearing off.

U.S. Pat. No. 5,361,470 to Bemardy (1994) shows a disk with both radial and axial cutting elements. The blade is very effective but has an Achilles heel. The axial elements are cupped and fairly perpendicular. They collect debris under certain conditions and this can lead to intermittent blade imbalances (Bemardy corrected this problem with U.S. Pat. No. 7,171,789, see above).

U.S. application Ser. No. 10/187,238 by Bemardy (2002) shows disks with semi circular and recessed, arced radial cutting elements. This design overcomes the limitations of Aono blades with respect to smooth cutting and offers good shredding, because the indented cutting segments are intermittantly effective in axial as well as radial directions. However, axial efficiency is somewhat less than what can be achieved with axially projected cutting elements as shown on the 2007 Bemardy patent. But while the latter blade has a blind spot in rearward axial directions, as already pointed out, the 2002 Bemardy design suffers no such limitation.

U.S. Pat. No. 4,766,794 to Blake (1988) also deserves inclusion as representative of blade disks with peripherally indented cutting elements and a cutting and shredding capability. However, the field belongs to table mounted saws, not brushcutters. Also, the design offers only a fraction of the operational smoothness needed for sapling cutting because it has two large peripheral indents, as illustrated, whereas, the comparative 2002 Bemardy Application shows (for good reasons) at least three and a like number of cutting segments, with additional distinguishable structure.

The teachings of each of the above listed citations (which does not itself incorporate essential material by reference) are herein incorporated by reference. None of the above inventions and patents, is seen to describe the instant invention as claimed. It can therefore be readily concluded, that due to the limitations of existing blades, room for further improvement exists. In particular, previous blade designs suffer from one or more of the following disadvantages:

a) They are specialty blades, only effective on narrow segments of vegetation.

b) They force the user to rely on different blades for different field conditions.

c) They are capable of effective cutting only in radial directions.

d) They are capable of effective shredding only in axial directions.

e) They may have a combined, but then only marginal effectiveness in both radial and axial directions.

f) They are effective in both radial and forward axial directions, but have no shredding effectiveness in an axial rearward direction.

g) They are uneconomical to produce and may be relegated to an unprofitable market niche or have no real market whatsoever, i.e. 'paper patents'.

h) They suffer excessively from a condition termed 'kickback', which is an undesirable torque reaction opposite to the direction of blade rotation and which may be unsafe.

i) They offer no way to clearly define and observe the cutting edge during use.

j) They heretofore are not capable of rendering excellent job performance in both a shredding and a cutting mode in unrestricted radial and axial directions, both forward and rearward, and with a low propensity for kickback.

SUMMARY AND ADVANTAGES

Conversely, a number of advantages of the present invention are:

A pivotably mountable brushcutter blade, comprising a blade body with opposing, parallel planes, a central mounting hole, segmented, circular, peripheral cutting edges alternating with segmented, radially recessed, arcuate, peripheral cutting edges, defining a direction of rotation, and forming an undulated periphery, and having auxiliary, axial segments with a cutting edge, formed out of said blade body, or separately attached, around a base line or juncture of the blade and having an acute angularity toward the periphery of the blade.

A pivotably mountable brushcutter blade, comprising a blade body with opposing, parallel planes, a central mounting hole, segmented, circular, peripheral edges with replaceable teeth, segmented, radially recessed, arcuate, peripheral edges with replaceable teeth, defining a direction of rotation and forming an undulated periphery, and with auxiliary axial segments formed or deflected out of said blade body, or separately attached, with replaceable teeth, wherein said axial segments are formed around a base line or juncture of the blade, with acute angularity toward the blade periphery.

A pivotably mountable brushcutter blade, comprising a planar member with paralleled, opposing major faces, a central mounting hole, a plurality of segemented, circular, peripheral cutting edges with or without replaceable teeth, and a plurality of segmented, arcuate, radially recessed, peripheral cutting edges with or without replaceable teeth, defining a direction of rotation, and forming an undulated circumference, and a plurality of auxiliary, axial segments with a cutting edge, with or without replaceable teeth, formed or deflected out of the blade body, or separately attached thereto, and wherein said axial segments are formed around a base line or juncture of said blade, with an acute angularity toward the periphery, and wherein a predetermined, vivid band of color contrasts distal margins of the peripheral cutting edges, whereby the segmented peripheral cutting edges blend into an optically illusory continuum during rapid blade movement, thereby affording the user a clear view of the actual cutting edge to better avoid contact with undesirable or hazardous objects.

The blade of the present invention presents numerous advantages, Including:

(a) providing a multipurpose blade with an accelerated cutting action for very efficient cutting and shredding of the entire range of vegetation, normally suitable for trimming with brushcutters;

(b) providing a highly efficient blade capable of shredding on both blade forward and blade rearward modes, thereby eliminating an otherwise unproductive rearward movement;

(c) providing a blade that has replaceable tooth structures which can be exchanged after undue wear, thereby extending blade life indefinitely;

(d) providing a blade that has axial cutting elements that are angled toward the blade periphery for effective self-cleaning under centrifugal forces;

(e) providing a blade that allows close proximity stacking, or 'nesting', because of outwardly angled axial cutting elements;

(f) providing a blade which can be more economically manufactured because the requirement of giving cutting teeth alternating, side to side angularity, or 'set' is eliminated;

(g) providing a blade which has openings for effective debris clearance both fore and aft of the axial cutting elements;

(h) providing a blade which has axial cutting elements with a radially inclined baseline, such that the foreward edge is nearer to the center than the rear and to provide a raking effect during shredding;

(i) providing a blade which has a range of axial cutting element structures to enhance shredding;

(j) providing a blade which can be conveniently reclaimed in the field by any user with ordinary skills and a common file;

(k) providing a blade which can be economically manufactured in a variety of materials including light weight elastomers, metal impregnated elastomers, etc. for use also on light duty devices, i.e. weedtrimmers, etc.;

(l) providing a blade which has bright color contrast on its distal cutting edges, providing the useful visual illusion of an unbroken, fully circular, bright band during rotation, (even though the blade periphery is actually segmented) and thus, by allowing the user to clearly see the cutting edges, advance blade safety a significant step;

(m) providing a blade design which effectively renders all ordinary brush blades obsolete and is the only blade type any consumer is likely to ever need purchase, since it both cuts and shreds efficiently under all possible field conditions.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

FIG. 1 is a full frontal view of one embodiment of the blade showing an undulated peripheral cutting edge with both fixed and a replaceable tooth structure, and three axial cutting elements.

FIG. 2 is a static frontal view of the blade without the axial cutting elements, but with a margin of the radial cutting portions that is to be bright color differentiated.

FIG. 3 is an illustration of the blade where the margins of the radial cutting segments are color differentiated, indicated in rotation and producing an illusory, but very useful, appearance of an optically continuous circle with clearly visible borders.

FIG. 4 is a side elevation perspective of an replaceable axial cutting element tooth structure and a fastening method.

FIG. 5 is an illustration of the undulating radial cutting edge grasping and cutting or shredding material during rotation.

REFERENCE NUMERALS IN DRAWINGS 10 blade
11 phantom blade
12a segment
12b segment
12c segment
14a chord portion
14b distal portion
14c recessed portion
16 axial cutting element
18a axial tooth structure
18b axial element, main portion
19 base line
20a fore debris clearance hole
20b aft debris clearance hole
20c extrusion void
22 imaginary circle 23 second arc
24 recessed tooth
26a chord
26b chord
28 base line central inclination
30 plane
32 mounting hole
33 blade center
33a radius
33b center, second arc
34a trailing tooth, of 14c
34b leading tooth, of 14c
36a trailing tooth, of 14b
36b leading tooth, of 14b
38 void
39 peripheral recess
40a replaceable tooth, radial
40b replaceable tooth, axial
42a radial tooth rivet hole
42b axial tooth rivet hole
44a radial tooth rivet
44b axial tooth rivet
46 cutting depth
48 radial blade portion rivet hole
52 axial cutting element rivet hole
53a inner border
53b inner border
53c inner border
54a differentiated blade margin
54b differentiated blade margin
54c differentiated blade margin
56 blade interior portion
58a merged cutting edge
58b merged inner border
60 cutting object
62 tooth structure
64 debris

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity for viewing and understanding rather than dimensional accuracy.

In the interest of clarity, not all of the routine features of the implementations described herein are shown and described. It will, of course, be appreciated that in the development of any such implementation, numerous implementation specific decisions must be made in order to achieve the developer's specific goals, such as compliance with application—and businesss—related constraints, and that these specific goals will vary from one implementation to another and from one developer to another. Moreover, it will be appreciated that such a development effort might be complex and time consuming, but would nevertheless be a routine undertaking of engineering for those of ordinary skill in the art having the benefit of disclosure.

The static physical structures of the present invention will now be described in detail with reference to the drawings.

FIG. 1 shows blade 10 in a preferred embodiment. Accordingly, the blade has three adjoining and identically constructed main segments 12a, 12b, and 12c, all on plane 30, with central mounting hole 32. To describe one segment, is to also describe each of the other identical segments. Segments further divide into an elongated tooth gullet, or chord portion 14a, distal portion 14b, and recessed portion 14c. The order is counterclockwise, in accordance with the indicated cutting direction, where each tooth point, or crown, clearly indicates the rotation (no separate directional arrow is used).

Chord portion 14a has distal chord 26a, and is radially recessed from imaginary circle 22, thereby in part, creating void 38. Chord 26a connects with trailing tooth 36a.

Distal portion 14b is semicircular, coincides with imaginary blade circle 22, and uses blade center 33. Trailing tooth 36a connects with chord 26a. Portion 14b further has tooth structure 62 and leading tooth 36b, connected to trailing tooth 34a of recessed portion 14c.

Recessed portion 14c is distally semicircular with a second arc 23, which uses center 33b and radius 33a. Center 33b is off-set from blade center 33 to create arc 23, radially recessed from imaginary circle 22. Trailing tooth 34a, leading tooth 34b and recessed tooth 24 correspond to arc 23. Leading tooth 36b of 14b connects with trailing tooth 34a of 14c. Leading tooth 34b of 14c, in turn connects with chord 26b, of an advanced adjoining segment.

The distance from chord 26b to imaginary circle 22 indicates the maximal depth of peripheral recess 39. The range of this recess distance is approximately 5% to 13% of the blade diameter. Blade 10, as shown, has about 12.5%, or a recess of 1.25 inches on a common 10 inch diameter blade. 34b is the leading tooth structure in each cutting segment, but additional teeth (not shown) may still be placed in advance of 34b, along chord 26b, in a rotational direction.

Typical axial cutting element 16, angularly rises from plane 30 at base line 19, to cause extrusion void 20c. Axial elements may be formed of original, native material, or attached separately (not shown) and are substantially flat with various shapes. Their preferred size in relation to the rest of the blade is as shown, with void 20c not much larger than about 10% of the entire blade surface area to avoid undue weakening of the blade structure. This also limits the axial protrusion of the axial elements when formed from native material. The axial elements main portion 18b is acutely angled toward the blade periphery.

The practical angle ranges broadly between 35 to just under 90 degrees, with approximately 60 degrees the preferred angularity.

The axial elements have axial tooth structure 18a, (with a number of variants possible, but not shown). They have both fore and aft debris clearance holes at 20a and 20b, respectively.

Axial cutting element base line 19 inclines radially with the leading end toward the center, where base line central inclination as shown at 28, may range from about 3 to 10 degrees.

A replaceable radial tooth structure 40a is shown at the top of blade 10, with rivet holes 42a for radial tooth rivets 44a, corresponding to radial blade portion rivet holes 48 on the blade. Cutting depth of the tooth is shown at 46 and may be varied, according to need or preference. A typical tooth structure formed of native blade material is shown at 62.

FIG. 2 shows blade 10 in a plane frontal stationary view without axial cutting elements, but with clearly defined, bright color (not shown) highlighted and differentiated blade margins of the cutting periphery 54a, 54b, and 54c, corresponding to segments 12a, 12b, and 12c, respectively. The margins have inner borders 53a, 53b and 53c, respectively.

FIG. 3 shows blade 10 in a rotational view with bright color (shown by interrupted lines), highlight margins 54a, 54b, and 54c (of FIG. 2). These visually combine to form an optical illusion, indicating a circle around blade interior portion 56, and clearly define the merged cutting edge 58a, as well as a merged inner border at 58b.

FIG. 4 shows axial cutting element 16 of blade 10, with rivet holes 52, replaceable tooth structure 40b with axial tooth rivet holes 42b, and rivets 44b.

FIG. 5 shows a sectional frontal view of blade 10 with cutting object 60, but without axial cutting elements. The blade is depicted in both actual 10 and phantom 11 outline, to indicate rotation during cutting action and indicates flying debris 64 and recessed cutting elements engagement in void 38.

OPERATION

FIGS. 1, 2, 3, 4, 5

Mounting of blade 10 is entirely conventional and is accomplished at center mounting hole 32. The hole is placed over an appropriately seized shaft boss or raised shoulder and fastened with blade and lock washers and an internally threaded lock nut. This mounting method is of the slip type and industry standard, although some manufacturers specify an additional cotter pin through both nut and brushcutter stub shaft for added security. Blades may also have a keyway (not shown), to engage the stub shaft. This mounting completely eliminates any possible slippage, but at the cost of transferring the full brunt of any sudden blade shock directly into the drive train.

The blade has axial cutting elements 16, and these project downward, or away from the brushcutter drive assembly, for trimming suitable flora. This axial element position also precludes any possible interference with typical protective blade shields and other structures.

Auto cleaning of the blade is essential to avoid debris adherence and associated high speed balance problems. Imbalances can produce violent vibrations at full speed and may lead to dangerous loss of operator control with possible injury. Planar blade portions 30, are unobstructed and also inherently self-cleaning. However, special attention for self cleaning of the axial cutting elements 16 is needed and provided by their acute angularity outward, toward the blade periphery. In accordance, base line 19 is radially inward and the main body portion 18a, angled toward blade periphery 22, is radially distal from the center. With high blade speeds (blades are typically rated to 10,000 RPM, driven through a reduction gear by engine speeds up to 12,000 RPM) powerful centrifugal forces urge debris upward, to the rear and away from the blade.

This mechanism effectively and reliably prevents debris adherence and any associated imbalance problems. Generous openings in the blade at both ends of the axial elements, at 20a and 20b, respectively, further augment self cleaning.

Primary axial shredding of the blade is accomplished as the axial cutting elements engage vegetation in any forward direction within a 180 degree arc. The axial elements are also radially inclined at their base lines; the leading edge is closer to the blade center than the trailing edge as shown at 28, FIG. 1. (or further away, not shown) This enhances shredding by introducing a certain amount of 'rake', or widening of the cut.

The axial elements are thus not longitudinally true to the cutting direction but instead cut slightly skewed, or crosswise. The angle must not be exaggerated, however, just a few degrees already produce the desired result. A synergistic effect of mild rake is a still further enhanced self cleaning action, as debris is directed rearward and away.

Use of an undulated cutting periphery significantly enhances both the cutting and the shredding action of the blade. Vegetation is thus not only shredded by the axial cutting elements, but in addition, also by the blade periphery. Because the undulated periphery can shred axially both fore and aft, a major problem is resolved.

A graphical depiction of the mechanism of peripheral shredding is shown at FIG. 5. Vegetation 60 ingresses into void 38, is engaged by recessed tooth structure 24, and by rotating phantom blade 11.

The pronounced additional axial shredding capability—both fore and aft—is a new and unexpected result.

The enhanced shredding action is clearly attributed to the undulated periphery. Because the undulated cutting edge is equally efficient fore and aft, it significantly adds to and enhances the already effective axial cutting elements in forward blade directions. But it now also provides an effective shredding action to the rear—where none existed before. The new rearward shredding capability significantly improves blade performance. The user can now easily shred in rearward directions without the tiring blade angle changes described above. All rearward blade motions are now also fully effective for shredding. Previously lost work motions have been made productive.

Safety is not impaired, nor is debris casting toward the operator significantly increased.

Still another new result—also entirely unexpected—is further enhanced radial cutting performance.

The recessed cutting element portions of the undulated peripheral edge present a much more aggressive cutting angularity into the work. This results in momentary cutting accelerations and enhanced efficiency. FIG. 5 again illustrates how actual cutting takes place. The blade engages cutting material 60 in its recessed void area 38 and as the blade rotates, accelerated cutting takes place. Phantom blade 11 depicts the rotation.

Circular blades normally require a certain amount of 'feed pressure', to engage the blade into the work. The amount of 'hook' or forward angle of each cutting tooth angle strongly influences feed pressure requirements. But too much hook can result in excessive 'kickback'. Kickback is defined as a strong (and often violent!) torque reaction of the blade opposite to its rotation. It can lead to loss of control and is a potential hazard. Tests have shown, that normal feed pressures are significantly reduced with the undulated, gently arced, peripheral cutting edge of the present invention, and kickback is not significantly increased. But the same mechanism which accelerates cutting also reduces needed feed pressure. As a consequence, the operator works with less effort.

Most saplings can be cut with just a quick and effortless single blade stroke.

This result is again new and unexpected.

Traditional saw blades are circular. Sawing action is strongly influenced by tooth number, tooth design, by hook and set and by the amount of blade torque applied, along with feed pressure. Tooth set is the alternating, side to side, angularity given each tooth on conventional blades. The purpose of set is to avoid blade binding in the cut. Set teeth cut a path wider than the blade itself and thus provide space for wood cell expansion, as sap is released from green wood. The wider cut also allows for some 'blade twist' in the cut. Blade twist is invariably introduced by operators, who find it impossible to hold a blade at a perfectly consistent cutting angle throughout the cut. The blade of the present invention takes full advantage of this phenomenon.

Because the blade has an interrupted, undulated peripheral cutting edge divided into segments, each segment enters the cut at a slightly different angle. Each blade revolution thus cuts somewhat wider than the last. The differences accumulate. A wider cut than the actual thickness of the blade is inadvertently produced. Thus the segmented, undulated cutting edge performs the same function and achieves the same result as normal set on a circular saw blade. Therefore, no set is required. The manufacturing step of forming tooth set is eliminated and an economic saving accrues. The functioning of an undulated, peripheral cutting edge in this manner and its inherent effect and benefit is serendipitous. This useful result is also new and entirely unexpected.

A new safety enhancement of the blade is achieved. Safety has special importance with brushcutters because of high engine and blade speeds and exposed cutting edges. Accidental injury often relates to flying debris fragments and objects inadvertently struck near the ground, such as stones etc. Objects struck can be propelled a considerable distance at high speed. It is essential to avoid striking undesirable objects. But in order to do this, the user must be able to see where the blade's cutting edge actually is. Inexplicably, conventional blades are often finished in dark colors and therefore offer almost no visual contrast to vegetation. Dark blade colors on blades are unhelpful in tracking the cutting edge and even add to the problem. Some blades are rendered virtually invisible when spinning. The popular star shaped 'triad' blades are a good example of this.

In contrast, the present blade has a bright color enhancement on the outermost margin of the blade at 54a, 54b, and 54c. The color selected is a highly reflective, bright, safety orange, or other very bright color contrasting well with vegetation. This differentiated blade margin of individual blade segments blends almost immediately into a vivid, bright, visual circle even during fairly slow blade speeds. Here a useful optical illusion is taken full practical advantage of, because the blade's cutting edge is in fact not continuous, but segmented and thus interrupted. But since the average human eye is only capable of processing up to about 24 fps (frames per second) and sees only smooth motion after that, a physiological phenomenon aptly termed the 'flicker-fusion—threshold' comes into play.

Accordingly, rotating blade sectors reflect light which reaches the retina of an observing operator, where it already begins to fuse the highlighted margins into a continuum, at the relatively low speed of 8 RPS (revolutions per second). Shown are three sectors on the blade; ergo: 3×8 equals 24. Typical brushcutters operate with blade speeds in the thousands of RPM. The principle is therefore useful and effective across the entire practical cutting speed range of any brushcutter.

The novel feature alerts the operator to the precise position of cutting edge at 58. Seeing the blade cutting edge with clarity, allows the user to accurately judge the blade engagement pattern and thereby significantly enhance his or her safety as well as the safety of bystanders and animals.

Efficient blade storage and handling during manufacturing and distribution cycles for large numbers of blades is provided by close stacking or 'nesting'. This is accomplished with the blade by its outwardly angled axial cutting elements which conveniently nest with any number of blades, much like open angled plastic lawn chairs. Only parallel surfaces contact, nesting cheek by jowl, and space requirements are thus minimized.

Alternative structures are possible. Exchangeable individual tooth structures can lead to greatly enhanced blade life. In this alternative the blade acts merely as a carrier for tooth structures and undergoes practically no degradation with good care. Such structures are illustrated at FIG. 1, with 40a, and at FIG. 4, with 40b, along with a fastening method. It is also understood that variations in both the number of undulations and the angularity of the radially recessed cutting edges will influence performance. If the recess is too radical, for example, both smoothness and safety will be compromised. If the recess is too shallow, performance suffers. The optimal structure is a trade off, but can be tailored to fit field needs. The recess shown at 38 and 24 in FIG. 1, was determined by extensive trials and field testing and was found to work very well, under normally encountered conditions.

Numerous changes can also be made to the axial cutting elements. Optimal angularity for axial elements is less than 90 degrees, but more than 40 degrees, with the best choice near 60 degrees. If the angle is less than 40 degrees, unexpected 'hooking' can occur, that is the axial elements can catch laterally on the trunk of a sapling, etc., being cut and cause serious kickback, the already familiar torque reaction opposite to blade rotation. Such a reaction could lead to momentary control loss and possible injury.

Near 90 degrees, the centifugal self cleaning action drops off dramatically and then may stop entirely. Sticky debris packets of unequal weight may accumulate leading to potentially dangerous imbalance and control problems at high speeds.

The height and also the length of the axial cutting elements can be varied. However, since the preferred technique is to extrude them from original blade stock, care must be taken to allow sufficient margins of blade material to remain in the plane to resist deformation or even breaking during hard service.

CONCLUSIONS RAMIFICATIONS AND SCOPE

It can be readily seen, that the present invention is a uniquely efficient all purpose blade, well suitable for trimming the entire range of vegetation suitable for work with brushcutters, including all grasses, weeds, vines, branches, and even substantial saplings. The blade functions efficiently in both cutting and shredding modes. It is easy and safe to use and economical to manufacture. In particular, its efficient on site shredding capability add a very useful labor saving device. In addition, it also makes a very positive environmental contribution. It can work large amounts of unwanted vegetation, including such nuisance plants as prickly blackberry, etc., down to near ground level and the shreddings can then be left as a natural mulch. This inhibits weeds, preserves moisture and finally enriches the soil through decomposition. The blade also saves fuel, and the potential savings are not trivial, with an estimated ten million brushcutters in service, nationally. It offers a practical alternative to burning or herbicide spraying, with their attendant pollution. It can virtually eliminate handling and debris hauling, and final disposal at some distant landfill.

Those skilled in the art will recognize that numerous modifications and changes may be made to the preferred embodiment, without departing from the scope of the claimed invention. Modification of the invention, in its various aspects, will be apparent to those skilled in the art, some being apparent only after study, others being matters of only routine mechanical design. No single feature, function or property of the preferred embodiment is essential. Other embodiments are possible, their specific designs depending upon their specific application. As such the scope of the invention should not be limited by the particular embodiments herein described, but should be defined only by the full scope of the appended claims and any and all equivalents thereof.

I claim:

1. An improved pivotably mountable brushcutter blade, comprising:
 a planar member with opposite parallel planes, having top and bottom sides, and a peripheral edge; with the top side facing the brushcutter for mounting, and for rotationally driving the blade in a predefined cutting direction;
 a central hole for mounting;
 a first sector of the planes bounded bilaterally by radii and distally by a first primary arc of an imaginary circle having a center coinciding with the blade center, with at least three cutting teeth capable of cutting in said predefined cutting direction, placed on said first primary arc; and
 a second sector contiguous with and in rotational advancement into said predefined cutting direction, positioned directly successive to said first sector, and bounded bilaterally by radii, and distally by a second primary arc of said imaginary circle, with at least three cutting teeth capable of cutting in said predefined cutting direction, placed on said second primary arc; and
 a third sector contiguous with and in rotational advancement into said predefined cutting direction, positioned directly successive to said second sector, and bounded bilaterally by radii and distally by a third primary arc of said imaginary circle, with at least three cutting teeth capable of cutting in said predefined cutting direction, placed on said third primary arc; and
 wherein said primary arcs of said first, second and third sector, respectively, join secondary arcs of three imaginary circles having centers offset from said blade center such that said secondary arcs form sections radially inward of said primary arcs, and rotationally advanced relative to said primary arcs in said predefined cutting direction and having teeth placed on said secondary arcs capable of cutting into said predefined cutting direction; and
 wherein said secondary arcs of said first, second and third sectors, are respectively rotationally aft of, and join a chord section of a rotationally advanced sector to said respective primary arcs, in said predefined cutting direction; and
 wherein each said chord section joins the aftmost point of its respective sector to the aftmost point of its respective primary arc; and
 comprising on said bottom side of said planar member auxiliary, axial cutting means, located a predetermined distance radially inward from said imaginary circle of said first sector, and radially outward of the blade center mounting hole, and having an unsevered angular juncture with said planar member, and having three sides severed, and extending substantially axially, with an acute angularity to said bottom side planar from the base line juncture, and toward said peripheral edge, and said axial cutting means angularly oriented for cutting in said predefined cutting direction; and
 wherein said unsevered angular junctures include a longitudinal orientation substantially into the blade cutting direction; and
 wherein said axial cutting means exhibit radial symmetry on said planar member.

2. The blade of claim 1, wherein a single, visually contrasting strip of coloring is applied to said top side of said planar member from a predetermined radially inward position, radially outward completely covering all distal cutting edges.

* * * * *